United States Patent [19]

Poerink

[11] Patent Number: 5,054,609

[45] Date of Patent: Oct. 8, 1991

[54] CONVEYER

[75] Inventor: Nikolaas J. Poerink, AA Borne, Netherlands

[73] Assignee: Jonge Poerink B.V., Borne, Netherlands

[21] Appl. No.: 460,312

[22] Filed: Jan. 3, 1990

[30] Foreign Application Priority Data

Jan. 9, 1989 [DE] Fed. Rep. of Germany ....... 8900158
May 10, 1989 [EP] European Pat. Off. ........... 89108392

[51] Int. Cl.$^5$ ............................................. B65G 17/06
[52] U.S. Cl. ..................................... 198/852; 198/831
[58] Field of Search ................. 198/831, 848, 851–853

[56] References Cited

U.S. PATENT DOCUMENTS 1,772,423  8/1930  Hurxthal .............................. 198/853
4,078,655  3/1978  Roinestad ............................ 198/848
4,957,597  9/1990  Irwin .................................. 198/848

Primary Examiner—Joseph E. Valenya
Attorney, Agent, or Firm—Felfe & Lynch

[57] ABSTRACT

A belt-like conveyor including at least two continuous chains which are parallel to one another and driven by sprocket wheels. The chains have a number of overlapping chain links and a number of carrying bars which are disposed transversely to the chains to which the end pieces of the bars are also connected. The end pieces of the bars also function as pins for the chain links while penetrating two of the latter and the remaining part of the carrying bars between the two end pieces serve as a carrying area of the conveyor. The carrying bars extend over the top of the chain links toward the exterior and end portions of the carrying bars are U-like bent toward the bottom and toward the inside and penetrate the chain links from the exterior, which permits an unimpeded lateral sliding on and off of pieces and which provides an enlarged carrying area and which is also suited for conveying heavy pieces while developng only a low surface pressure.

11 Claims, 5 Drawing Sheets

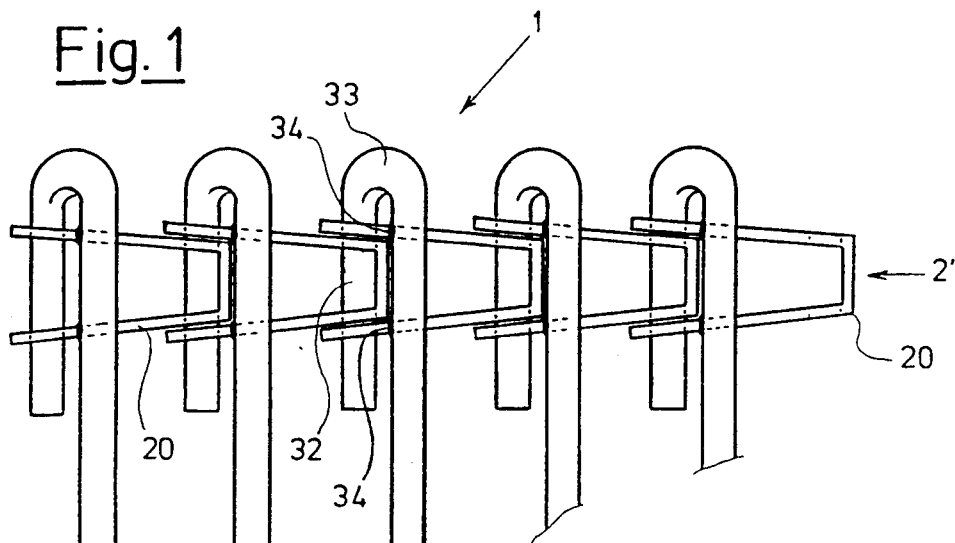
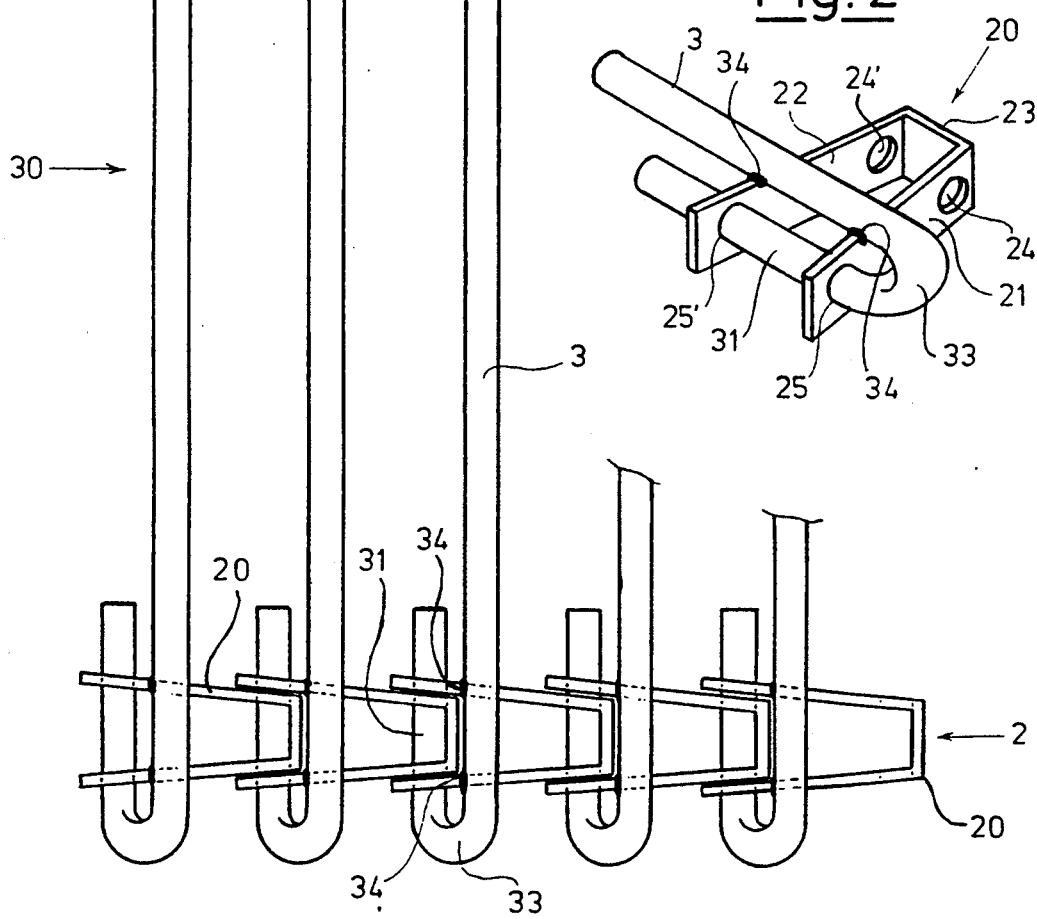

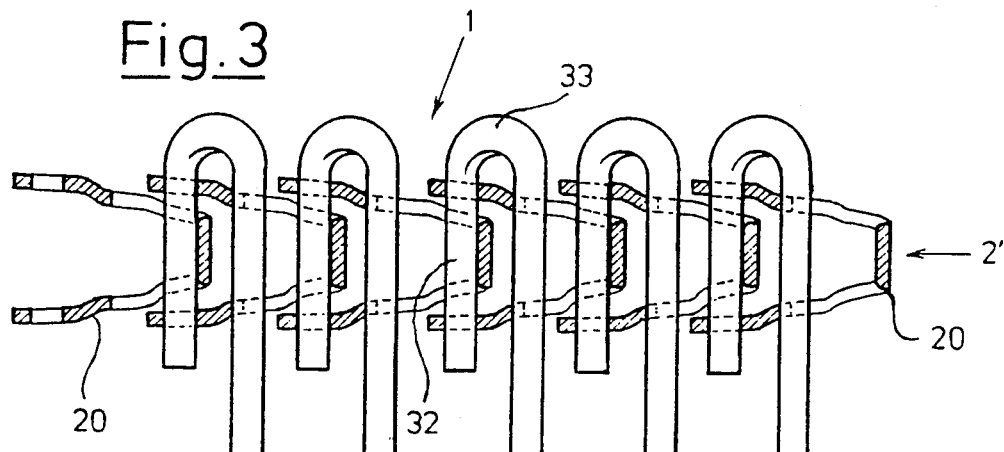
Fig.3
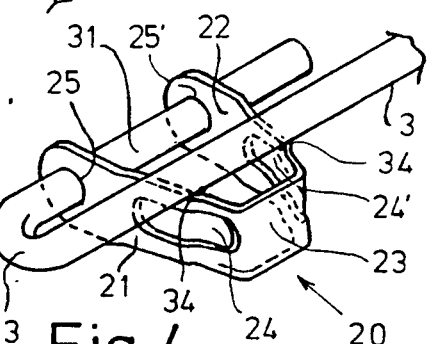
Fig.4
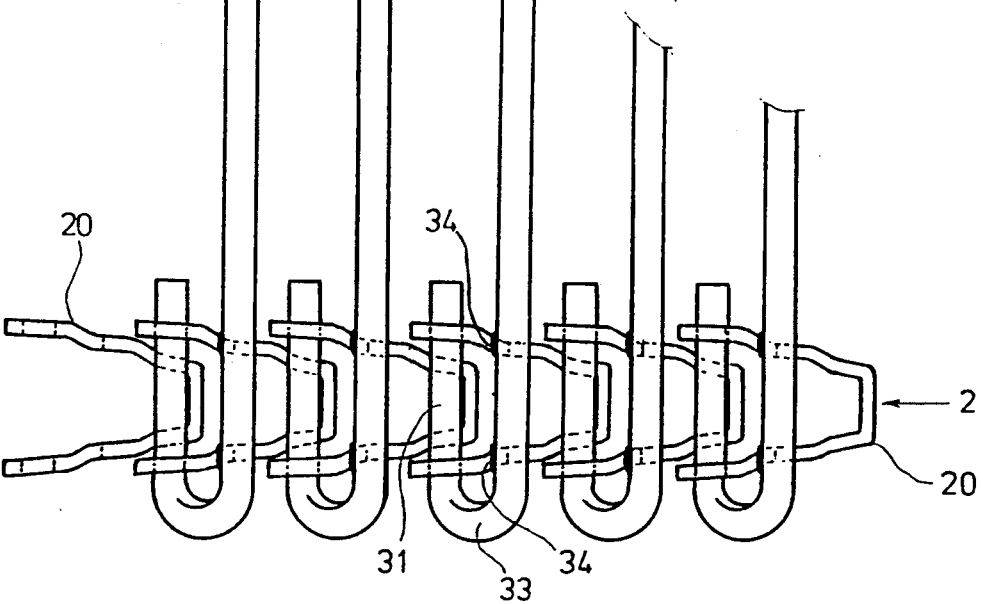

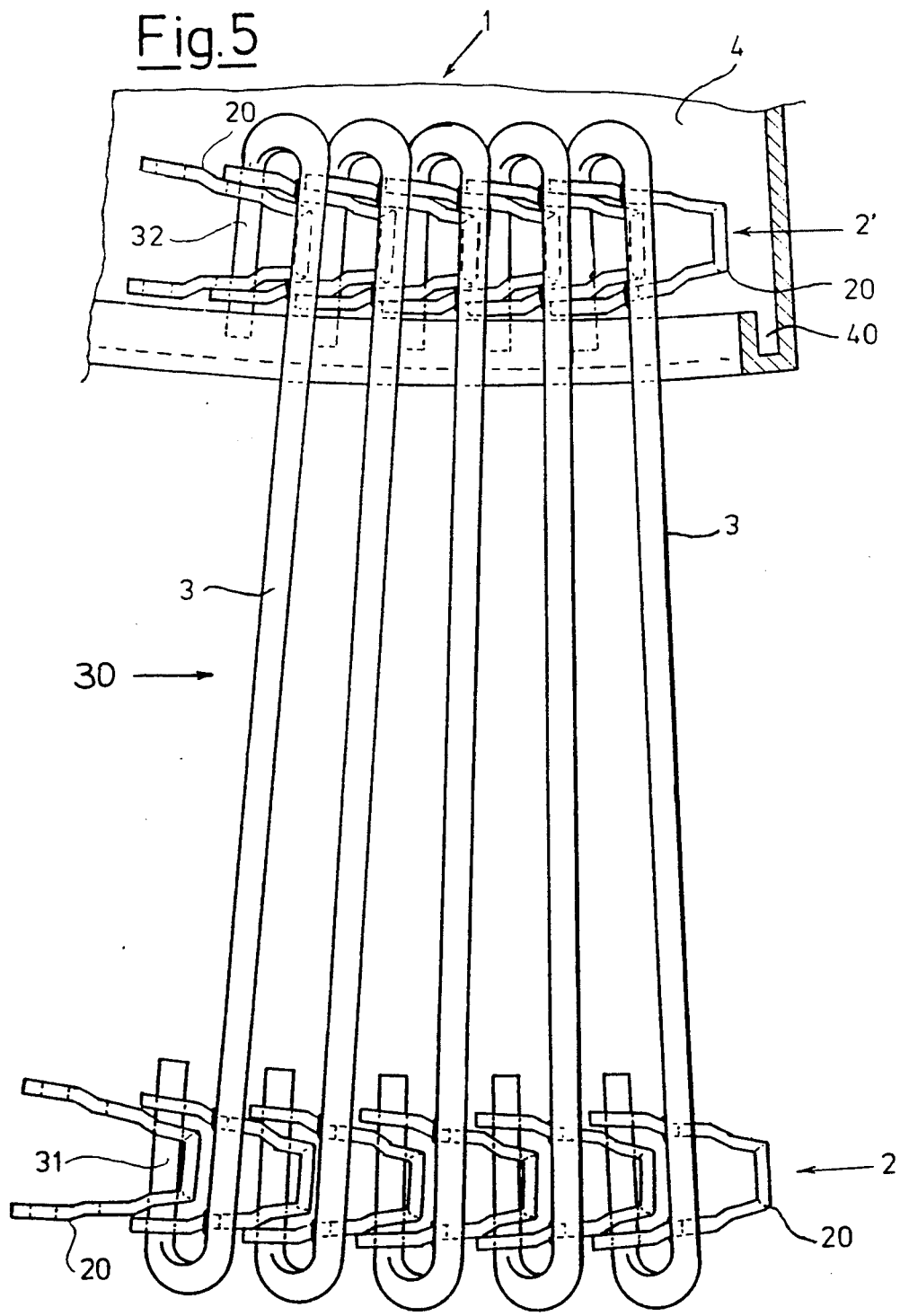

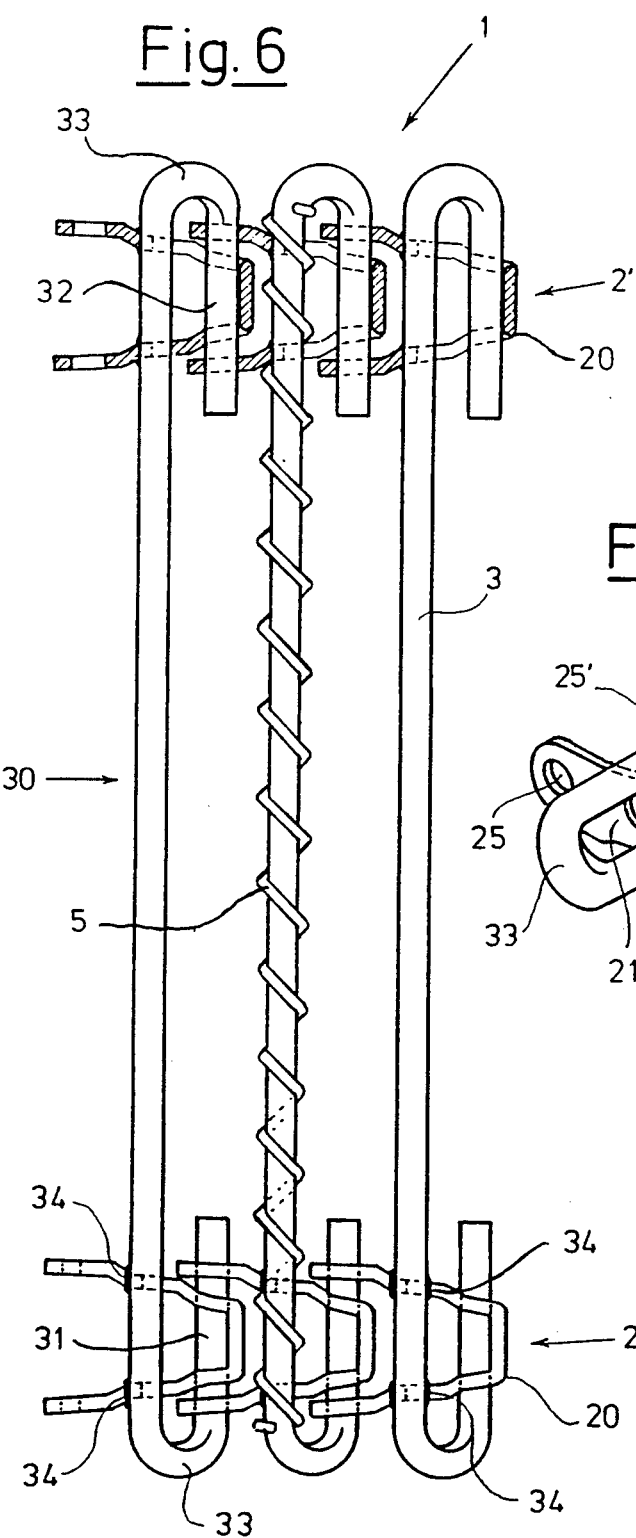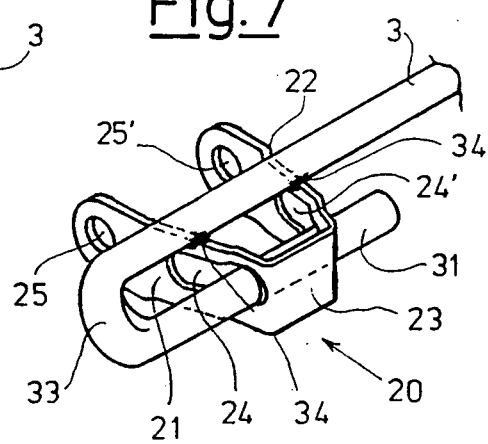

CONVEYER

The invention relates to a belt-like conveyor including at least two continuous chains which are parallel to one another and driven by sprocket wheels. These chains have a number of overlapping chain links and a number of carrying bars which are disposed transversely to the chains to which the end pieces of these bars are also connected. The end pieces of the bars also function as pins for the chain links while penetrating two of the latter and the remaining part of the carrying bars between the two end pieces serves as the carrying area of the conveyor.

Conveyors of this general kind are known and are used, particularly, in industrial plants for internal transporting purposes. Basically, there are two embodiments which are among the most common:

The first embodiment has continuous straight carrying bars with end pieces which penetrate the chain links from the inside toward the outside. A conveyor of this kind is relatively simple to manufacture, however, it has the disadvantage that the carrying area of the carrying bars is lower than the upper edge of the lateral chains. Sliding goods to be conveyed onto and off the conveyor from the side is hence not possible; the goods must be lifted in order to move them laterally. Moreover, the available carrying area is limited to the surface between the chains.

The second known embodiment of the conveyor of the aforesaid kind has carrying bars which have crank-like bent end pieces; the bent end segment points toward the bottom and the end pieces of the carrying bars also penetrate the chain links from the inside to the outside. This serves the purpose that the carrying area is above the upper edge of the chain, however, the disadvantage remains that the carrying zone is limited to the area between the chains. An additional disadvantage is the formation of a high torque at the ends of the carrying bars while conveying heavy pieces. These torques expose the connections between bars and chain links to heavy stress which either leads to premature damage or requires a strong and, hence, expensive design.

It is hence an object of the invention to provide a conveyor of the aforesaid general kind which permits an unimpeded lateral sliding on and off of pieces, which provides an enlarged carrying area and which is also suited for conveying heavy pieces while developing only a low surface pressure.

The object is achieved in accordance with the invention by a conveyor of the aforesaid general kind which is characterized in that at both longitudinal sides of the conveyor — in respect to the top, conveying side of the conveyor — the carrying bars are extended over the top of the chain links toward the exterior and in that the end pieces of the carrying bars are U-like bent toward the bottom and toward the inside and penetrate the chain links from the exterior.

The new conveyor offers a particularly broad carrying zone which extends on both sides over the chains. The bent segments of the carrying bars are on the longitudinal sides of the conveyor and the roundness ensures that the goods can be easily slid on and off. Areas at the margin of the conveyor which are not supported as well as shoulders and edges at the margin of the carrying zone are now avoided. Since the carrying bars can also rest on top of the chains, if necessary, it is possible to convey heavy pieces without damaging the conveyor.

In addition, the manufacture of the conveyor is simple and inexpensive since it includes, despite the advantages as compared to aforesaid prior art, only two different components, the identical chain links and the identical carrier bars, that is.

In order to reduce the surface pressure in the horizontal plane, it is advantageous that the carrying bars be meander-like bent. In accordance with the invention, a conveyor comprises at least two parallel, continuous chains which are driven by sprocket wheels. Each chain has a number of overlapping chain links. The conveyor includes a number of carrying bars which have end portions and which are disposed transversely to the chains and are connected thereto approximately at their ends. The end portions of these carrying bars serve as pins for the chain links, two of which each end portion penetrates and the remaining part of each carrying bar which is between the end portions serving as the carrying zone of the conveyor. At both longitudinal sides of the conveyor — with respect to the top, conveying side of the conveyor — the carrying bars extend over the top of the chain links toward the exterior and end portions of the carrying bars are U-like bent toward the bottom and toward the inside and penetrate the chain links from the exterior.

For a better understanding of the invention, together with other and further objects thereof, reference is made to the following description, taken in connection with the accompanying drawings, and its scope will be pointed out in the appended claims.

Referring now to the drawings:

FIG. 1 is a top plan view of a segment of a conveyor in a first embodiment;

FIG. 2 is detailed fragmentary perspective view of a portion of the conveyor of FIG. 1;

FIG. 3 is a top plan view of a segment of the conveyor in a second embodiment;

FIG. 4 is a detailed fragmentary perspective view of a portion of the conveyor of FIG. 3;

FIG. 5 is a top plan view of the conveyor segment of FIG. 3 in a curve;

FIG. 6 is a top plan view of the conveyor in a third embodiment;

FIG. 7 is a detailed fragmentary perspective view of a portion of the conveyor of FIG. 6;

Figure 8:
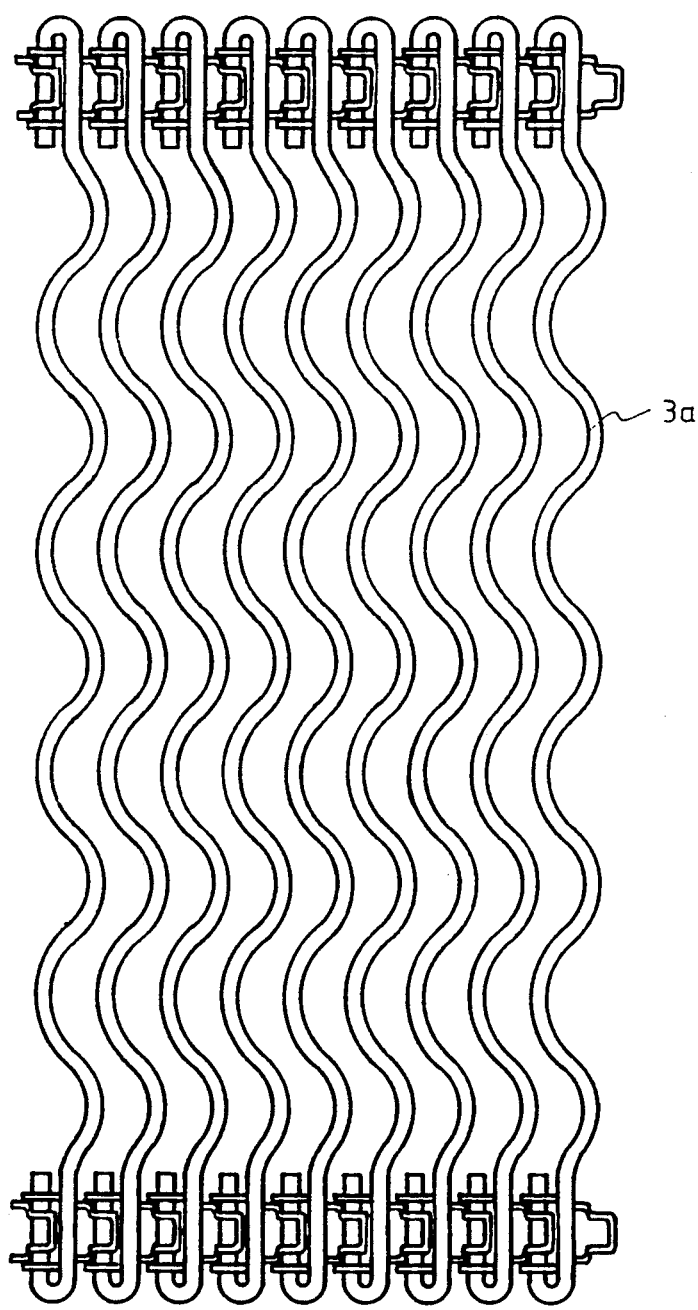
FIG. 8 is a top plan view of the conveyor which has meander-like bars.

Referring now more particularly to FIG. 1 of the drawings, the first illustrated embodiment of the conveyor 1 includes two parallel, spaced-apart chains 2 and 2' as well as a number of carrying bars 3 running transversely to the chains 2 and 2'. The chains 2 and 2' include a number of chain links 20 which, in a top plan view, assume the form of V or U-like bent strips. Two adjacent chain links 20 are flexibly joined to each other and the end pieces 31 and 32 of the carrier bars 3 serve as pins for these chain links 20. For this purpose, the carrier bars extend over the top of the chains 2 and 2' toward the exterior where they are bent back toward the inside and toward the bottom and they penetrate the chain links 20 from the exterior toward the interior. At its side, the conveyor 1 is, hence, bounded by a series of bent segments 33 of the carrier bars 3. The area of the carrier bars 3 between the two bent segments 33 forms the carrying zone 30 of the conveyor 1 onto which the pieces to be conveyed are placed.

In the embodiments represented in the drawings, the chain links 20 and the carrying bars 3 preferably are made of metal, preferably steel. Correspondingly, the individual parts of the conveyor 1 are fixed in that in the area of the chains 2 and 2' each carrying bar 3 is rigidly connected, in this case welded, to the chain links 20 which it penetrates. Corresponding welding spots bear the reference numeral 34. Two chain links 20 and a carrying bar 3 thus form a unit which is flexibly joined to further units including like components. At its end points, the conveyor 1 can thus be redirected and driven by means of sprocket wheels.

The detailed representation in FIG. 2 shows how the chain link 20 is formed and how it is connected to the appertaining carrying bar 3. In this case, the chain link 20 is V-shaped with two diverging sides 21 and 22. At the two close ends, they are joined via a flat arch 23. In the vicinity of the arch 23, two aligned openings 24 and 24' which form a first pair of openings penetrate the two sides 21 and 22. In the area of the free ends 21 and 22, two additional and also aligned openings 25 and 25' are provided through which the end piece 31 of the carrying bar 3 extends, in this case. A bent segment 33 of the carrying bar 3 is clearly visible in the right bottom portion of FIG. 2. This bar is a lateral boundary of the conveyor. Further, at the top of the chain link 20, FIG. 2 shows two welding spots 34 connecting the latter to the carrying bar 3.

In the embodiment according to FIGS. 1 and 2, the openings 24, 24', 25 and 25' are configured as circular boreholes; as opposed thereto, the embodiment according to FIGS. 3 and 4 shows chain links 20, where the pair of openings 24, 24' is configured as a pair of long holes which extends in the moving direction of the conveyor 1. This is particularly obvious in the cross sectional representation of the chain 2' and the chain links 20 in the top portion of FIG. 3 as well as in the perspective view of the chain link 20 according to FIG. 4.

The carrying bars 3 are configured as described further above, i.e. at their ends, they are bent toward the bottom and toward the inside. Again, the center part of the carrying bars 3 forms the carrying zone 30. Also, the chain links 20 are joined to the appertaining carrying bars 3 by means of a welded connection 34 in the area of the bent segments 33 of the carrying bars 3. The chains 2 and 2' are identical in the embodiment according to FIG. 3.

FIG. 4 shows the already mentioned long holes 24 and 24' which are disposed in the two sides 21 and 22 of the chain link 20 in the vicinity of the arch 23. The openings 25 and 25' at the free end of the sides 21 and 22, however, are configured as round boreholes.

A further difference in the aforesaid embodiment is that the two sides 21 and 22 are not flat but the distance in between increases in steps. A jamming of the chain links 20 is thus avoided in case of a sharp redirecting in the area of the end points of the conveyor.

FIG. 4 is a further representation of the carrying bar 3 which is rigidly connected to the top of the chain link 20 via a welded connection 34. Via the bent segments 33, the bar penetrates with its end piece 31 the chain link 20 from the exterior toward the interior through openings 25 and 25'.

As seen in FIG. 3 and 4, there is a longitudinal play between the individual chain links 20 of the two chains 2 and 2' which serves the purpose to impart certain curve negotiating properties to the conveyor 1.

These curve negotiating characteristics are particularly obvious in FIG. 5 showing the conveyor 1 in the area of a curve. In the lower portion of FIG. 5, the chain links 20 of the lower chain 2 of FIG. 5 are at the largest possible distance from each other. In the upper portion of FIG. 5, the chain links 20 of the chain 2' have the smallest possible distance to one another such that the conveyor 1 follows the resulting curve. The chain links 20 of the two chains 2 and 2' are configured as shown in FIGS. 3 and 4.

Again, the carrying bars 3 form the carrying zone 30 and the carrying bars 3 at the inside of the curve of the conveyor 1 are closer to one another than the those at the outside of the curve of the conveyor 1. As described above, the end pieces 31 and 32 of the carrying bars 3 are bent and penetrate the chain links 20.

As also seen in FIG. 5, at the inside zone of the conveyor 1, i.e. next to the chain 2', the chain links 20 and the arches 23 thereof are underneath the carrying bars 3; an escaping of the chain links 20 toward the top is thus avoided.

For example, a metal guiding frame 4 has an opening 40 in which the end pieces 32 of the carrying bars 3 are disposed.

FIGS. 6 and 7 show a further embodiment of the conveyor 1. The chain links 20 of the two chains 2 and 2' as well as the carrying bars 3 are identical with the chain links 20 and the carrying bars 3 of the embodiment according to FIGS. 3 to 5. The only difference is that the carrying bars 3 are not rigidly connected to the chain link 20 which they penetrate through the rear opening; they are, however, rigidly connected to the chain link 20 which they penetrate through the front opening. This is particularly obvious in FIG. 7 wherein the end piece 31 of the carrying bar 3 penetrates the front openings 24 and 24' which are again configured as long holes. Since the carrying bar 3, however, is rigidly connected to this chain link 20 by means of the welded connection 34, the end piece 31 of the carrying bar has no play in the openings 24 and 24' in the longitudinal direction of the chain links. This simple modified connection between the chain links 20 and the carrying bars 3 thus provides a conveyor 1 which no more exhibits the aforesaid curve dependency. It is thus possible to use two identical components to realize two different embodiments of the conveyor 1 while the manufacturing and maintenance costs are reduced.

FIG. 6 also shows a wire spiral 5 which, as an example, is disposed on one of the carrying bars 3. It serves the purpose to lift conveyed pieces from the carrying bars which is advantageous with respect to cooling effects. In all other respects, the embodiment of the conveyor 1 in accordance with FIGS. 6 and 7 corresponds to the embodiment as described in FIGS. 3 and 5, i.e. the reference numerals used correspond to those used in FIGS. 3 to 5.

Figure 9:
FIG. 9 is a side view of the conveyor according to FIG. 8.

In order to reduce the surface pressure on the pieces which are conveyed, it is possible in accordance with FIG. 8 and 9 to replace the straight carrying bars 3 of FIGS. 1 to 7 by meander-like bent carrying bars 3a also in the horizontal plane; the pieces conveyed then advantageously stabilize the position of said bars.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Conveyor comprising:
   at least two parallel, continuous chains which are driven by sprocket wheels and each having a number of overlapping chain links;
   a number of carrying bars which have end portions and which are disposed transversely to the chains and are connected thereto approximately at their ends, end portions of these carrying bars serving as pins for the chain links, two of which each end portion penetrates and the remaining part of each carrying bar which is between the end portions serving as the carrying zone of the conveyor;
   at both longitudinal sides of the conveyor — with respect to the top, conveying side of the conveyor — the carrying bars extending over the top of the chain links toward the exterior and end portions of the carrying bars being U-like bent toward the bottom and toward the inside and penetrating the chain links from the exterior.

2. Conveyor in accordance with claim 1, in which the chain links are formed as one piece each from V-like bent strips having sides which diverge and having a front pair and a rear pair of aligning pin openings for the end portions of the carrying bars.

3. Conveyor in accordance with claim 1, in which the chain links are configured as one piece each from U-like bent strips having sides which increasingly diverge, and each chain link having a front pair and a rear pair of aligning pin openings for the end portions of the carrying bars.

4. Conveyor in accordance with claim 1, in which each chain link has one pair of openings which is configured as a pair of long holes extending in a moving direction of the conveyor.

5. Conveyor in accordance with claim 1 in which approximately at its end, each carrying bar is rigidly connected to one of the chain links which each carrying bar penetrates.

6. Conveyor in accordance with claim 1, in which the carrying bars have bottom sides and the carrying bars are inclined to one common direction and at the edge of the carrying zone, and in the area of the chain links, the carrying bars rest with their bottom sides on the latter.

7. Conveyor in accordance with claim 1, which comprises at least one wire spiral which is slid on at least one of the carrying bars in the area of the carrying zone.

8. Conveyor in accordance with claim 1, in which the bent end portions of the carrying bars which penetrate the chain links and form the exterior, and in which toward the interior the carrying bars extend over the chain links toward the interior under the carrying zone, and in which on each longitudinal side of the conveyor, the carrying bars glide in a guiding groove which is open toward the exterior and is part of a support and guiding frame extending underneath the carrying zone of the conveyor.

9. Conveyor in accordance with claim 1, in which the chain links and the carrying bars are made of plastic and have a glass fiber reinforcement.

10. Conveyor in accordance with the claim 1, in which the chain links and the carrying bars are made of metal.

11. Conveyor in accordance with claim 1, in which in the horizontal plane, the carrying bars are meander-like bent.

* * * * *